(12) United States Patent
Wakizaka et al.

(10) Patent No.: US 8,170,628 B2
(45) Date of Patent: May 1, 2012

(54) TELEPHONE COMMUNICATION DEVICE

(75) Inventors: Masaaki Wakizaka, Ichinomiya (JP);
Koji Akagi, Aichi-ken (JP)

(73) Assignee: Brother Kogyo Kabushiki Kaisha,
Nagoya-shi, Aichi-ken (JP)

( * ) Notice: Subject to any disclaimer, the term of this patent is extended or adjusted under 35 U.S.C. 154(b) by 357 days.

(21) Appl. No.: 12/646,900

(22) Filed: Dec. 23, 2009

(65) Prior Publication Data

US 2010/0167800 A1 Jul. 1, 2010

(30) Foreign Application Priority Data

Dec. 26, 2008 (JP) .................................. 2008-332219

(51) Int. Cl.
*H04M 1/00* (2006.01)
(52) U.S. Cl. ................ 455/575.1; 455/550.1; 455/156.1
(58) Field of Classification Search .......... 455/347–350,
455/550.1, 575.1, 67.7, 156.1; 379/31, 80,
379/85, 100.16, 282
See application file for complete search history.

(56) References Cited

U.S. PATENT DOCUMENTS

| 7,769,353 B2 | 8/2010 | Dietrich et al. | |
|---|---|---|---|
| 2003/0114189 A1* | 6/2003 | Moon | 455/556 |
| 2003/0220722 A1* | 11/2003 | Toba et al. | 701/1 |
| 2004/0204190 A1 | 10/2004 | Dietrich et al. | |
| 2004/0207728 A1* | 10/2004 | Kihara et al. | 348/143 |
| 2007/0137468 A1* | 6/2007 | Shibata | 84/723 |
| 2007/0202858 A1* | 8/2007 | Yu | 455/414.1 |
| 2008/0058102 A1* | 3/2008 | Hato | 463/35 |
| 2008/0122803 A1* | 5/2008 | Izadi et al. | 345/175 |
| 2008/0204430 A1* | 8/2008 | Cheon et al. | 345/184 |
| 2008/0228856 A1* | 9/2008 | Sano | 709/201 |
| 2009/0197615 A1* | 8/2009 | Kim et al. | 455/456.1 |
| 2009/0238085 A1* | 9/2009 | Khanduri | 370/252 |
| 2010/0039408 A1* | 2/2010 | Cho et al. | 345/175 |
| 2010/0079379 A1* | 4/2010 | Demuynck et al. | 345/169 |

FOREIGN PATENT DOCUMENTS

| JP | H10-028169 A | 1/1998 |
|---|---|---|
| JP | H11-305984 A | 11/1999 |
| JP | 2003-037651 A | 2/2003 |
| JP | 2005-528845 T | 9/2005 |
| JP | 2008-167323 A | 7/2008 |

OTHER PUBLICATIONS

Japan Patent Office; Notification of Reason for Refusal for Patent Application No. JP2008-332219, mailed Sep. 28, 2010.
Japan Patent Office, Notification of Reason for Refusal for Japanese Patent Application No. 2008-332219, mailed Dec. 14, 2010.

* cited by examiner

*Primary Examiner* — Dominic E Rego
(74) *Attorney, Agent, or Firm* — Baker Botts L.L.P.

(57) ABSTRACT

A telephone communication device having a sound generating portion, a sound receiving portion, a detecting portion for detecting a state of approach or contact of a region of a housing between sound output and input apertures of the sound generating and receiving portion, to or with the face of the user, a reference-state memory for storing a reference approach-contact state of the region detected in a standard position of the housing relative of the user's face, a state-change obtaining portion for obtaining a change of the state of approach or contact, with respect to the reference approach-contact state, an adjustment-amount determining portion for determining amounts of adjustment of the sound output level and sound input level according to the obtained change, and a control portion for adjusting the sound output level and sound input level according to the determined amounts of adjustment.

13 Claims, 7 Drawing Sheets

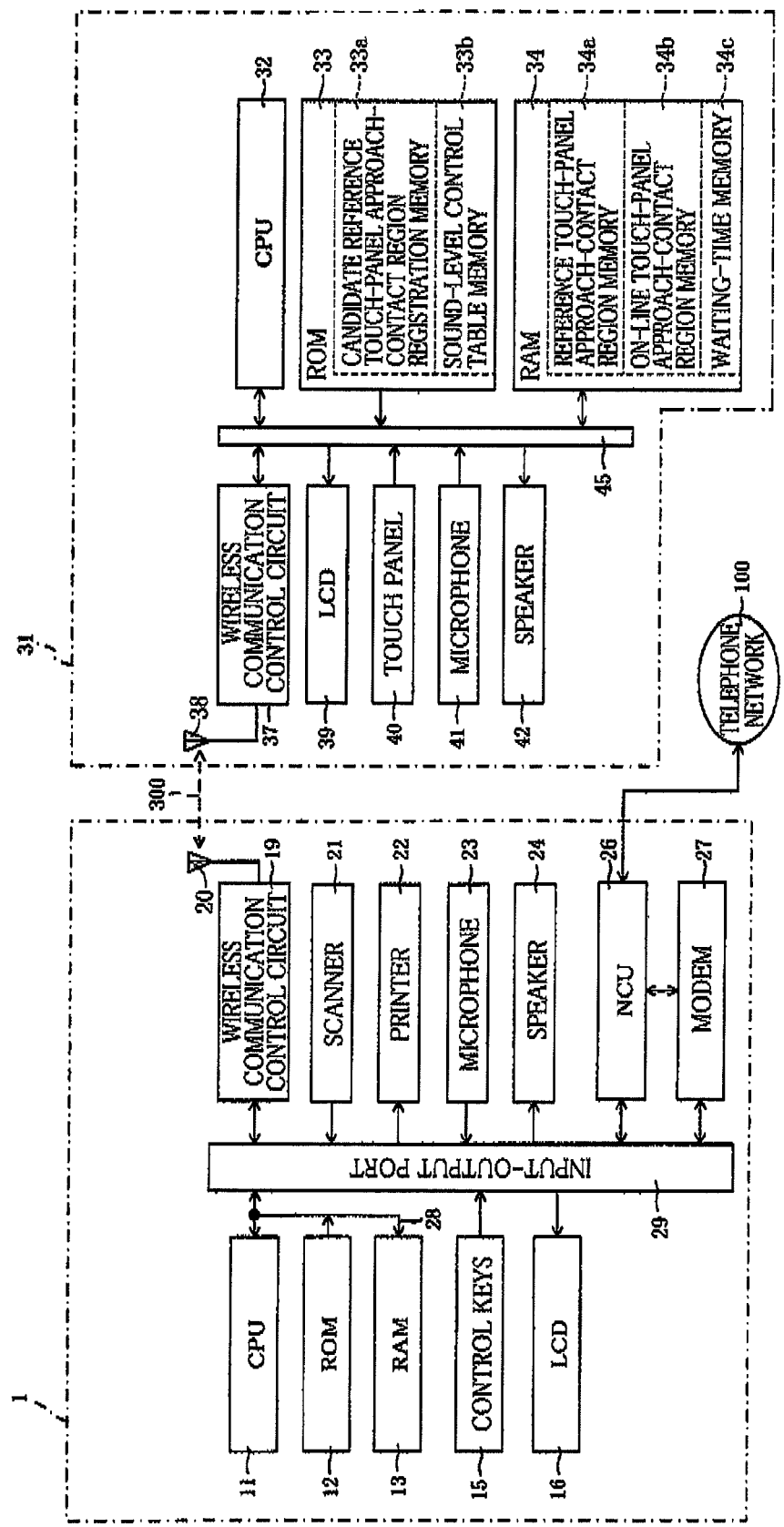

FIG. 3

EXEMPLARY TABLE FOR CONTROL OF INPUT AND OUTPUT SOUND LEVELS OF MICROPHONE AND SPEAKER ACCORDING TO A CHANGE OF ON-LINE TOUCH-PANEL APPROACH-CONTACT REGION WITH RESPECT TO REFERENCE REGION

| RESULT OF COMPARISON OF ON-LINE REGION WITH REFERENCE REGION | SOUND LEVEL CONTROL | REMARKS |
|---|---|---|
| ON-LINE REGION MOVED TOWARD MICROPHONE | LOWERING INPUT SOUND LEVEL OF MICROPHONE AND RAISING OUTPUT SOUND LEVEL OF SPEAKER | MICROPHONE MOVED TOWARD THE MOUTH, AND SPEAKER MOVED AWAY FROM THE EAR |
| SURFACE AREA OF ON-LINE REGION INCREASED IN THE DIRECTION TOWARD MICROPHONE | LOWERING INPUT SOUND LEVEL OF MICROPHONE | MICROPHONE PRESSED AGAINST USER'S FACE |
| ON-LINE REGION MOVED TOWARD MICROPHONE, AND SURFACE AREA OF ON-LINE REGION INCREASED | GREATLY LOWERING INPUT SOUND LEVEL OF MICROPHONE, AND RAISING OUTPUT SOUND LEVEL OF SPEAKER | MICROPHONE MOVED TOWARD THE MOUTH AND PRESSED AGAINST THE USER'S FACE, AND SPEAKER MOVED AWAY FROM THE EAR |
| ON-LINE REGION MOVED TOWARD MICROPHONE, AND SURFACE AREA OF ON-LINE REGION REDUCED | LOWERING INPUT SOUND LEVEL OF MICROPHONE AND GREATLY RAISING OUTPUT SOUND LEVEL OF SPEAKER | MICROPHONE MOVED TOWARD THE MOUTH, AND SPEAKER MOVED AWAY FROM THE EAR |
| ON-LINE REGION MOVED TOWARD SPEAKER | RAISING INPUT SOUND LEVEL OF MICROPHONE AND LOWERING OUTPUT SOUND OF SPEAKER | SPEAKER MOVED TOWARD THE EAR, AND MICROPHONE MOVED AWAY FROM THE MOUTH |
| SURFACE AREA OF ON-LINE REGION INCREASED IN THE DIRECTION TOWARD SPEAKER | LOWERING OUTPUT SOUND LEVEL OF SPEAKER | SPEAKER PRESSED AGAINST USER'S FACE |
| ON-LINE REGION MOVED TOWARD SPEAKER, AND SURFACE AREA OF ON-LINE REGION INCREASED | RAISING INPUT SOUND LEVEL OF MICROPHONE, AND GREATLY LOWERING OUTPUT SOUND LEVEL OF SPEAKER | SPEAKER MOVED TOWARD THE EAR AND PRESSED AGAINST THE USER'S FACE, AND MICROPHONE MOVED AWAY FROM THE EAR |
| ON-LINE REGION MOVED TOWARD SPEAKER, AND SURFACE AREA OF ON-LINE REGION REDUCED | GREATLY RAISING INPUT SOUND LEVEL OF MICROPHONE AND LOWERING OUTPUT SOUND LEVEL OF SPEAKER | SPEAKER MOVED TOWARD THE EAR, AND MICROPHONE MOVED AWAY FROM THE EAR |
| APPROACH OR CONTACT OF TOUCH PANEL NOT DETECTED | ESTABLISHING HANDS-FREE TELEPHONE MODE | TOUCH PANEL MOVED AWAY FROM USER'S FACE |

TELEPHONE COMMUNICATION DEVICE

CROSS REFERENCE TO RELATED APPLICATION

The present application claims the priority from Japanese Patent Application No. 2008-382219 filed Dec. 26, 2008, the disclosure of which is herein incorporated by reference in its entirety.

BACKGROUND OF THE INVENTION

1. Field of the Invention

The present invention relates to a telephone call or communication device.

2. Description of Related Art

There is known a telephone communication device including a mobile communication device which is provided with an array sensor. The array sensor detects a distance from the mouth of the user of the mobile communication device to a microphone, for compensation for reduction of an input sound level of the microphone with an increase of the detected distance. The array sensor also detects a distance from the ear of the user to a speaker, for compensation for reduction of a sound volume received from the speaker with the increase of the detected distance.

SUMMARY OF THE INVENTION

However, the telephone communication device described above has the following problems. When the user of the mobile communication device speaks in an environment in which a noise level is relatively high, for example, the input speech sound level of the microphone is lower than usual even if the speech is initiated with the microphone being positioned near the mouth of the user, so that a sound volume transmitted from the microphone tends to be unfavorably smaller than necessary.

Where the person with which the user of the mobile communication device speaks relatively loudly, on the other hand, the sound volume received from the speaker is larger than usual even if the telephone communication is initiated with the speaker being positioned a relatively long distance away from the ear of the user, so that the sound volume received by the user tends to be unfavorably larger than necessary.

It is an object of the present invention to provide a telephone communication device which does not suffer from the problems described above and which permits adequate adjustment of a sound volume received from a sound generating portion thereof and a sound volume transmitted from a sound receiving portion thereof.

The object indicated above can be achieved according to the principle of this invention, which provides a telephone communication device for telephone communication of a user thereof with the other party, comprising: a housing; a sound generating portion having a sound output aperture provided at the housing and configured to generate a voice received from the other party such that the voice is emitted from the sound output aperture with an adjustable sound output level; a sound receiving portion having a sound input aperture provided at the housing and configured to receive through the sound input aperture a voice to be transmitted to the other party, such that the voice is received with an adjustable sound input level; a detecting portion configured to detect a state of approach or contact of a region of the housing between the above-indicated sound output aperture and the above-indicated sound input aperture, to or with a face of the user, during the telephone communication of the user with the other party; a reference-state memory portion for storing a reference approach-contact state, which is the state of approach or contact of the above-indicated region detected in a reference state of the approach or contact of the region of the housing, the reference state being one of the states of approach or contact of the region detected by the detecting portion; a state-change obtaining portion configured to obtain a change of the state of approach or contact of the above-indicated region detected by the detecting portion, with respect to the above-indicated reference approach-contact state stored in the reference-state memory portion; an adjustment-amount determining portion configured to determine an amount of adjustment of the sound output level of the sound generating portion and an amount of adjustment of the sound input level of the sound receiving portion, according to the change of the above-indicated state obtained by the state-change obtaining portion; and a control portion configured to command the adjustment-amount determining portion, when the change of the above-indicated state is obtained by the state-change obtaining portion, to determine the amount of adjustment of the sound output level of the sound generating portion and the amount of adjustment of the sound input level of the sound receiving portion, the control portion adjusting the above-indicated sound output level and the above-indicated sound input level according to the determined amounts of adjustment.

BRIEF DESCRIPTION OF THE DRAWINGS

The above and other objects, features, advantages and technical and industrial significance of the present invention will be better understood by reading the following detailed description of a preferred embodiment of the present invention, when considered in connection with the accompanying drawings, in which:

FIG. 2 is a block diagram showing electric arrangements of the MFP and the cordless handset;

FIG. 3 is a schematic view indicating an example of a manner of controlling input and output sound levels of the cordless handset according to a change of an on-line touch-panel approach-contact region of the cordless handset with respect to a reference pattern;

DETAILED DESCRIPTION OF THE PREFERRED EMBODIMENTS

The preferred embodiment of this invention will be described in detail, by reference to the accompanying drawings.

Figure 1:
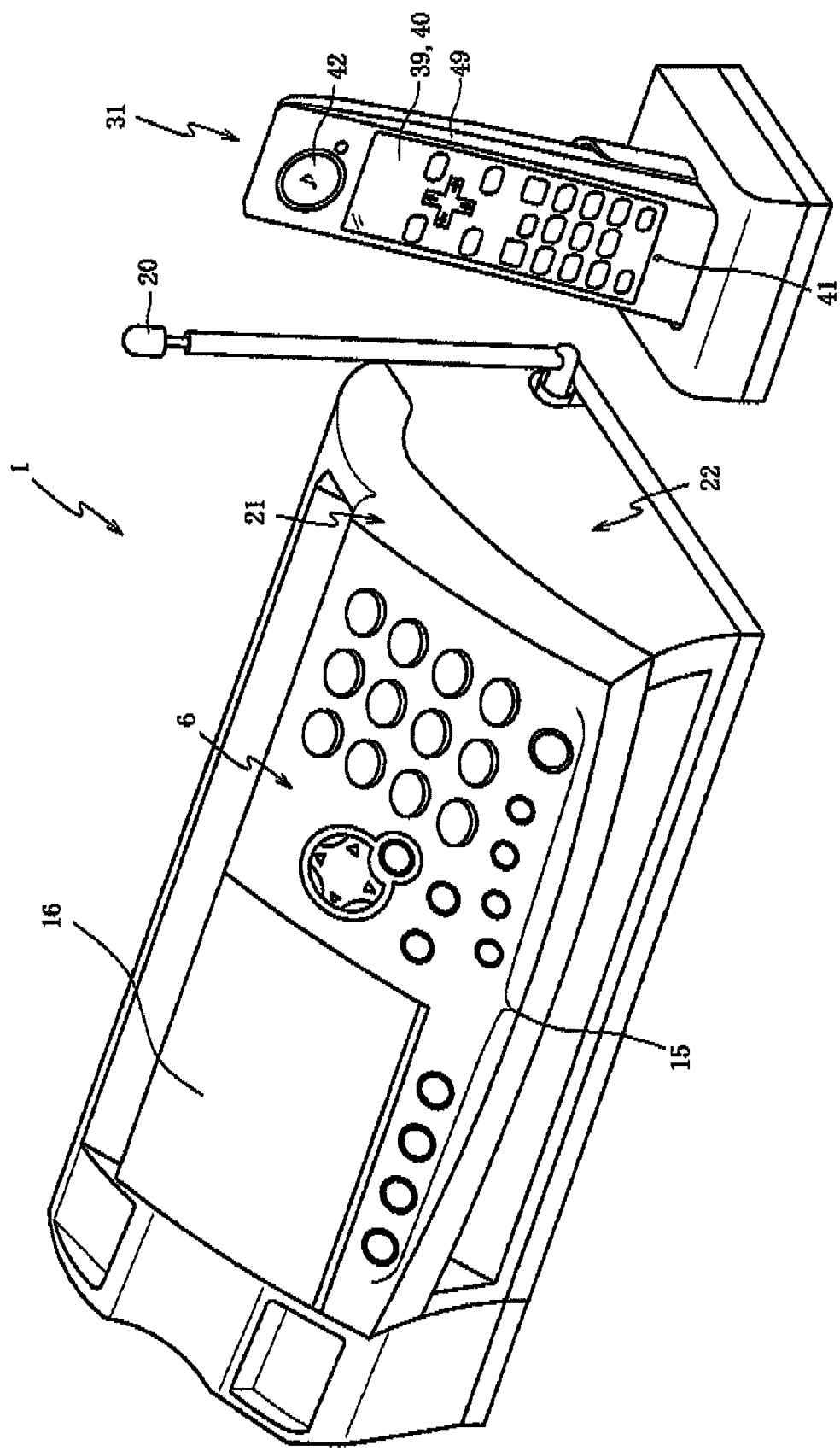
FIG. 1 is a perspective view showing a telephone communication device constructed according to one embodiment of this invention in the form of a cordless handset as a child unit, and a multi-function peripheral (MFP) having a parent unit with respect to the child unit.

Referring first to the perspective view of FIG. 1, there are shown a telephone communication device constructed according to one embodiment of the present invention in the form of a cordless handset 31 as a child unit, and a multifunction peripheral (MFP) having a parent unit with respect to the cordless handset 31.

First, the MFP 1 (parent unit) will be explained. The MFP 1 has various functions in addition to a telephone call or communication function, and is connected to a telephone network 100 (shown in FIG. 2) for performing the telephone communication function and other functions.

Then, the cordless handset 31 serving as the telephone communication device will be explained. The cordless handset 81 has a housing 49 incorporating a LCD 39 exposed in its front surface. The LCD 39 has an input device in the form of a touch panel 40 having a display function. The LCD 39 is provided with numeral keys and other keys for entering an operating procedure and a state of telephone communication of the cordless handset 31, and telephone numbers of the party with which the user desires to speak.

The touch panel 40 are finger-touched by the user. Namely, images displayed on the LCD 39 are finger-touched by the user. When a pointer in the form of a finger of the user approaches or touches a certain area of the touch panel 40, this approach or touch of the finger is detected to specify the position of the surface area in question. The cordless handset 31 incorporates a CPU 82 as indicated in the block diagram of FIG. 2, and the CPU 32 performs an operation corresponding to an image displayed in the surface region area the position of which has been detected.

While various types of touch panel (e.g., resistive film type and infrared type) are available, the touch panel 40 of the cordless handset 31 provided as the telephone communication device according to the present embodiment is of a projection type and a capacitance type. The capacitance type touch panel is configured such that when a finger approaches or touches the touch panel, the finger and the touch panel are electrostatically coupled to each other, so that the capacitance or electrostatic capacity between the finger and the touch panel changes. The capacitance type touch panel configured to detect a change of the electrostatic capacity is able to detect not only the touch of the finger with the touch panel, but also the approach of the finger to the touch panel.

The touch panel 40 of the projection type is configured to detect simultaneously changes of the electrostatic capacity at a plurality of local areas within the touch panel. That is, the touch panel 40 is provided with a matrix of electrodes positioned in the respective local areas arranged in the form of a grid or lattice, for instance, to detect the finger approach or touch to or with the respective areas.

In the present embodiment of the telephone communication device in the form of the cordless handset 31, the area of the touch panel 40 which approaches or touches the face of the user during the telephone communication through the cordless handset 31 is detected as described below in detail. This area of the touch panel 40 will be referred to as "a touch-panel approach-contact region", the approach or contact of which to or with the face of the user has been detected by the touch panel 40. In particular, the touch-panel approach-contact region detected during the telephone communication is referred to as "an on-line touch-panel approach-contact region". The term "approach" of the area or region is defined to mean a movement or a state of approach of the area to the user's face to a position that is spaced from the face by a distance not longer than a predetermined value.

A sound receiving portion in the form of a microphone 41 (more precisely, a sound input aperture of the microphone 41) is disposed below the LCD 89 and touch panel 40, such that the sound input aperture is provided at the front surface of the housing 49 of the cordless handset 31. The microphone 41 serves as a sound receiving portion of the telephone communication device, which converts an input sound into a sound signal. Where the MFP 1 is connected through the telephone network 100 to an external device not shown, the cordless handset 31 permits the user to implement a conversation or telephone call with the user of the external device.

A voice sound generated by the user of the cordless handset 31 (child unit) is converted by the microphone 41 into a sound signal, which is transmitted to the MFP 1 (parent unit) through wireless communication indicated at 300 in FIG. 2. Where the MFP 1 is connected to the external device for telephone communication, the sound signal is subsequently transmitted to the external device through the telephone network 100.

A sound generating portion in the form of a speaker 42 (more precisely, a sound output aperture of the speaker 42) is disposed above the LCD 39 and touch panel 40, such that the sound output aperture is provided at the front surface of the housing 49 of the cordless handset 31. The speaker 42 serves as a sound generating portion of the telephone communication device, which converts an input sound signal received through the MFP 1 into a sound such as an alarm sound or message generated upon occurrence of an error, a call sound generated upon reception of a telephone call signal from an external device (not shown) through the telephone network 100, or a voice sound generated according to a sound signal received from the external device through the telephone network 100. The output volume of the voice to be emitted from the sound output aperture of the speaker 42 according to the sound signal received from the external device is adjusted to a suitable level before generation of the voice from the speaker 42.

Referring further to the block diagram of FIG. 2, the electric arrangements of the MFP 1 and the cordless handset 31 (telephone communication device) will be described. The MFP 1 includes an operator's control panel 6 having a plurality of keys 15 (shown in FIG. 1), and incorporates a CPU 11, a ROM 12, a RAM 13, a wireless communication control circuit 19, an NCU 26, etc., as major components.

The CPU 11, ROM 12 and RAM 13 are connected to each other through a bus line 28, while the wireless communication control circuit 19, NCU 26, bus line 28, etc. are connected to each other through an input-output port 29.

The CPU 11 controls various functions of the MFP 1 and the various portions connected to the input-output port 26, according to predetermined control values and control programs stored in the ROM 12 and RAM 13, and various signals received and transmitted through the wireless communication control circuit 19 and NCU 26.

The ROM 12 is a read-only memory storing the control programs executed by the MFP 1, and the RAM 13 is a re-writable volatile memory, which temporarily stores various kinds of data during the operation of the MFP 1.

The wireless communication control circuit 19 has a wireless communication antenna 20 for wireless communication (indicated at 300 in FIG. 2) with a wireless communication control circuit 37 of the cordless handset 31, for data and telephone communication with the cordless handset 31.

The NCU 26 is connected to the telephone network 100, and is configured to transmit a dial signal to the telephone network 100 and to receive the call signal from the telephone network 100.

Then, the electric arrangement of the cordless handset 31 serving as the telephone communication device will be described. The cordless handset 31 includes, as major elements, a CPU 32, a ROM 33, a RAM 34, and the above-indicated wireless communication control circuit 37, LCD 39, touch panel 40, microphone 41 and speaker 42. The CPU 32, ROM 38, RAM 34, wireless communication control circuit 37, LCD 39, touch panel 40, microphone 41 and speaker 42 are connected to each other through a bus line 45.

The CPU 32 controls the various portions connected to the bus line 45, according to predetermined control values and control programs stored in the ROM 33 and RAM 34, and various signals received and transmitted through the wireless communication control circuit 37. The ROM 33 is a read-only memory storing various control programs executed by the CPU 32, which include a telephone communication control routine illustrated in the flow chart of FIG. 6, and a reference touch-panel approach-contact region determining routine illustrated in the flow chart of FIG. 7. The routine of FIG. 7 is executed to determine a reference touch-panel approach-contact region of the touch panel 40 of the cordless handset 31. This reference touch-panel approach-contact region is indicated at 50r in FIG. 4, and at 53r in FIG. 5. Those routines will be described in detail.

The ROM 33 includes a candidate reference touch-panel approach-contact region registration memory 33a, and a sound-level control table memory 33b. The candidate reference touch-panel approach-contact region registration memory 33a stores data indicative of a list of a plurality of candidate reference touch-panel approach-contact regions from which the reference touch-panel approach-contact region 50r, 53r is selected. The sound-level control table memory 33b stores data indicative of a table for control of the input sound level of the microphone 41 and the output sound level of the speaker 42 according to a change of an on-line touch-panel approach-contact region indicated at 50a in FIG. 4 or at 53a in FIG. 5. The above-indicated table for control of the input sound level of the microphone 41 and the output sound level of the speaker 42 (hereinafter referred to as "a sound level control table") is indicated in the schematic view of FIG. 3.

The sound level control table of FIG. 3 will be described by reference to FIGS. 4 and 5. In FIG. 3, a column entitled "REMARKS" is provided for easier understanding of the reasons for the sound level control of the microphone 41 and speaker 42, but does not constitute a part of the sound level control table. Strictly speaking, the "microphone" and "speaker" indicated in FIG. 3 should respectively read --the sound input aperture of the microphone 41--, and --the sound output aperture of the speaker 42--.

The sound level control table lists different manners of control of the input sound level of the microphone 41 and the output sound level of the speaker 42, which different manners correspond to respective different results of comparison of the on-line touch-panel approach-contact region 50a, 53a with the reference touch-panel approach-contact region 50r, 53r. Although the reference and on-line touch-panel approach-contact regions 50r, 50a are indicated in FIG. 4 while the reference and on-line touch-panel approach-contact regions 53r, 53a are indicated in FIG. 5, for easy understanding of the sound level control table of FIG. 3, the CPU 32 do not discriminate these regions 50, 53 from each other, in the control of the sound levels of the microphone 41 and speaker 42. Actually, only one reference touch-panel approach-contact region 50r, 53r is stored in a reference touch-panel approach-contact region memory 34a of the RAM 34, and only one on-line touch-panel approach-contact region 50a, 53a is stored in an on-line touch-panel approach-contact region memory 34b of the RAM 34. It will be understood that the sound-level control table memory 33b serves as a different-modes memory portion which stores different modes of the change of the on-line touch-panel approach-contact region 50a, 53a with respect to the reference touch-panel approach-contact region 50r, 53r, at least one of the amounts of adjustment of the sound input level of the microphone 41 and the sound output level of the speaker 42, which respectively correspond to the different modes of the change.

In the case of "ON-LINE REGION MOVED TOWARD MICROPHONE" indicated in FIG. 3, that is, when the on-line touch-panel approach-contact region 50a is moved toward the sound input aperture of the microphone 41, for instance, the sound levels of the microphone 41 and speaker 42 are controlled such that the input sound level of the microphone 41 is lowered, while the output sound level of the speaker 42 is raised, as indicated in FIG. 3. In the case of "SURFACE AREA OF ON-LINE REGION INCREASED IN THE DIRECTION TOWARD MICROPHONE" indicated in FIG. 3, that is, when the surface area of the touch-panel approach-contact region 50a is increased in the direction toward the sound input aperture of the microphone 41, the input sound level of the microphone 41 is lowered. The manners of control of the input and output sound levels of the microphone 41 and speaker 42 in the other cases are also indicated in FIG. 3.

Figure 4:
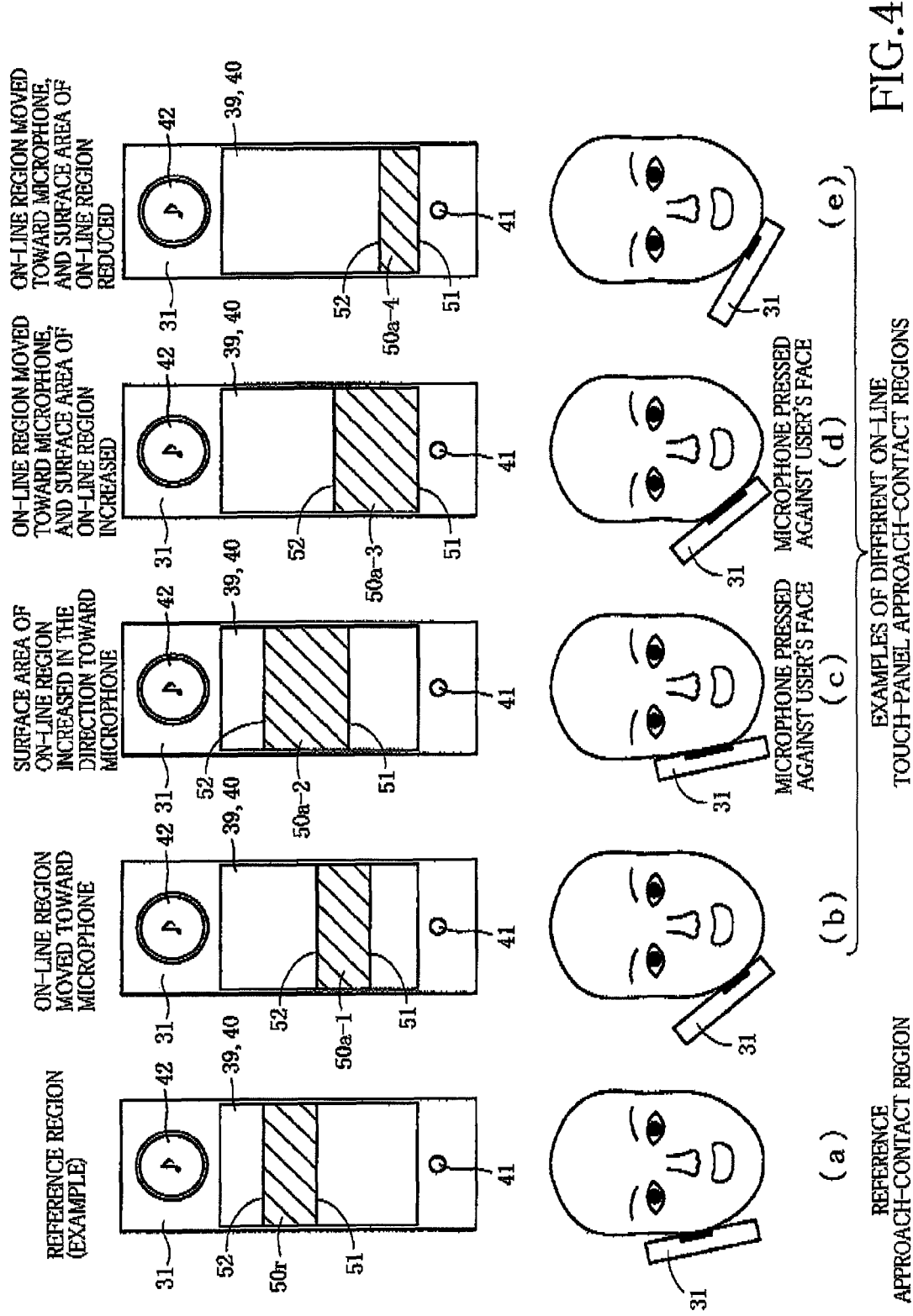
FIG. 4 is a schematic view for explaining an example of the reference touch-panel approach-contact region, and examples of different on-line touch-panel approach-contact regions, regarding a microphone of the cordless handset.
Figure 5:
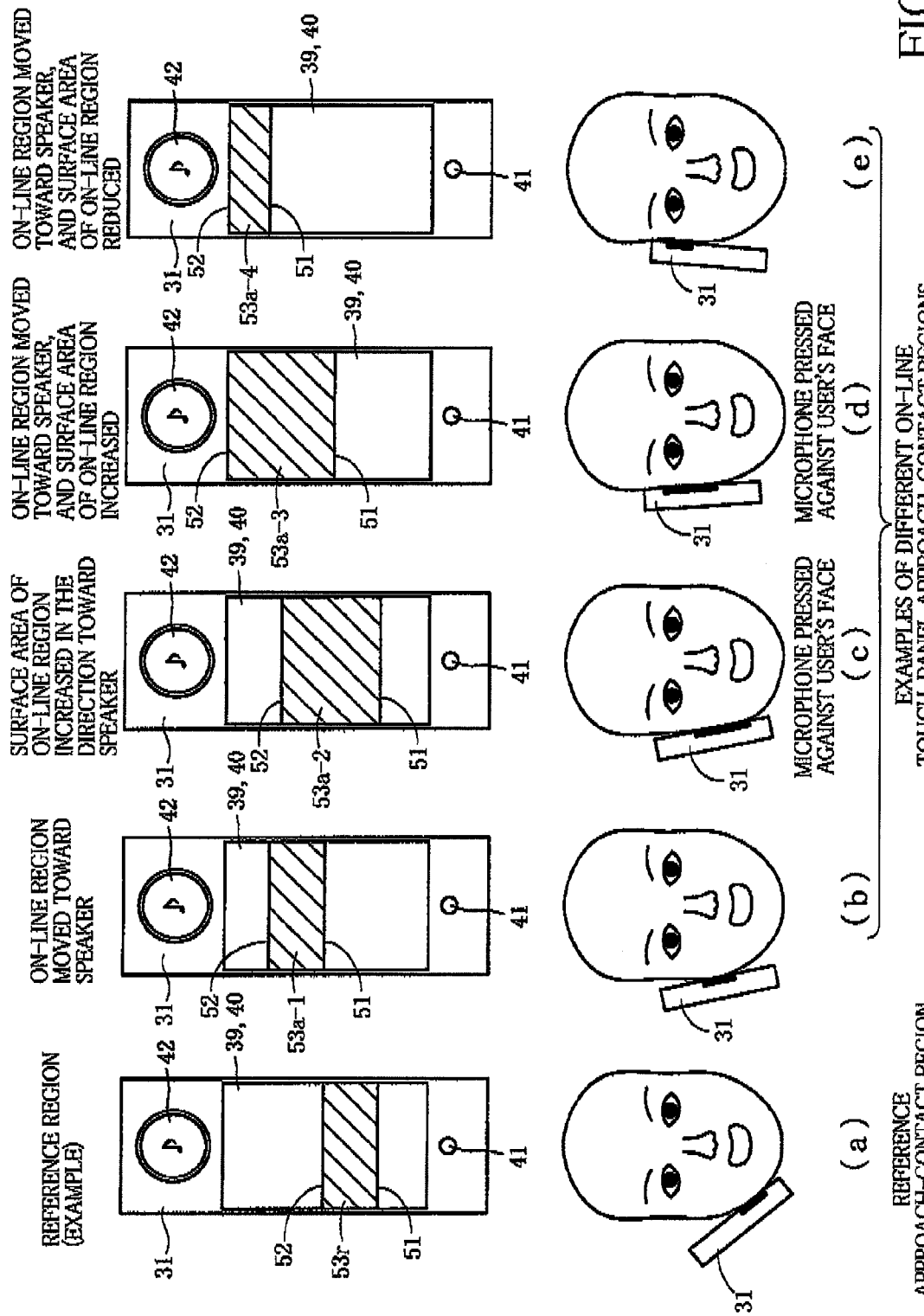
FIG. 5 is a schematic view for explaining an example of the reference touch-panel approach-contact region, and examples of different on-line touch-panel approach-contact regions, regarding a speaker of the cordless handset.

As indicated above, the schematic view of FIG. 4 shows an example of the reference touch-panel approach-contact region 50r, and examples of the different on-line touch-panel approach-contact regions 50a-1 through 50a-4, while the schematic view of FIG. 5 shows an example of the reference touch-panel approach-contact region 53r, and examples of the different on-line touch-panel approach-contact regions 53a-1 through 53a-4. The reference touch-panel approach-contact regions 50; 53r and the on-line touch-panel approach-contact regions 50a, 53a of the touch panel 40 are indicated by hatching lines in the upper part of FIGS. 4 and 5, and by black areas in the lower part of FIGS. 4 and 5 in which the cordless handset 31 is shown in touch with the face of the user.

FIG. 4 shows at (a) one example of the reference touch-panel approach-contact region 50r, in reference position and attitude of the cordless handset 31 (touch panel 40) in which the sound input aperture of the microphone 41 has a reference position relative to the mouth of the user. FIG. 4 shows at (b) through (e) examples of the four different on-line touch-panel approach-contact regions 50a-1 through 50a-4, namely, four different touch-panel approach-contact regions 50a-1 through 50a-4 in respective different positions of the cordless handset 31 during telephone conversation or communication of the user through the cordless handset 31.

The reference touch-panel approach-contact region 50r is determined according to the determining routine illustrated in the flow chart of FIG. 7, and the on-line touch-panel approach-contact region 50a is repeatedly compared with the determined reference region 50r during the telephone communication, according to the telephone communication control routine illustrated in the flow chart of FIG. 6, as described below in detail. Each time a result of the comparison is obtained, the CPU 2 refers to the sound level control table of FIG. 3 stored in the sound-level control table memory 33b of the ROM 33, so that the input sound level of the microphone 41 and the output sound level of the speaker 42 are controlled in the appropriate manner corresponding to the obtained result of the comparison, according to the sound level control table.

When the sound input aperture of the microphone 41 of the cordless handset 31 is moved from a reference position indicated at (a) in FIG. 4 toward the mouth of the user, while the sound output aperture of the speaker 42 is moved from the reference position in the direction away from the ear of the user, as indicated at (b) in FIG. 4, for example, the on-line touch-panel approach-contact region 50*a* is moved toward the sound input aperture of the microphone 41, to the on-line position 50*a*-1. That is, the on-line touch-panel approach-contact region 50*a*-1 indicated at (b) in FIG. 4 is compared with the reference touch-panel approach-contact region 50*r* indicated at (a). The comparison reveals that both a lower end 51 of the on-line region 50*a*-1 on the side of the microphone 41 and an upper end 52 of the on-line region 50*a*-1 on the side of the speaker 42 have been moved toward the sound input aperture of the microphone 41, while the surface area of the on-line region 50*a*-1 remains substantially constant. Thus, the CPU 32 determines that the on-line touch-panel approach-contact region 50*a* has been moved toward the sound input aperture of the microphone 41.

As a result, the sound levels of the microphone 41 and speaker 42 are controlled according to the sound-level control table of FIG. 8, in the manner corresponding to the result of the comparison, that is, in the manner corresponding to the determination that the on-line region 50*a* has been moved toward the sound input aperture of the microphone 41.

Even in the case of the movement of the microphone 41 of the cordless handset 31 toward the mouth of the user from the reference position indicated at (a) in FIG. 4 to the on-line position indicated at (b), therefore, the input sound level of the microphone 41 is lowered to adjust the sound volume to be transmitted to the external device (not shown), so that the transmitted sound level in the on-line position is almost equal to that in the reference position. Further, the output sound level of the speaker 42 is raised to adjust the sound volume to be generated and received from the speaker 42, so that the received sound volume in the on-line position is almost to that in the reference position, even in the case of the movement of the speaker 42 away from the ear of the user. The lower and upper ends 51, 52 and the surface area of the touch-panel approach-contact region 50*a* can be specified or calculated on the basis of the output signals of the matrix of electrodes of the touch panel 40, which specify the on-line approach-contact region 50*a* that approaches or touches the face of the user. Thus, the touch panel 40 serves as a detecting portion operable to detect an approach or contact of a region of the housing 49 to or with the face of the user during the telephone communication of the user with the other party.

When the microphone 41 of the cordless handset 31 in the reference position indicated at (a) in FIG. 4 is pressed against the face of the user, as indicated at (c) in FIG. 4, the comparison of the on-line touch-panel approach-contact region 50*a* with the reference touch-panel approach-contact region 50*r* reveals that the surface area of the on-line touch-panel approach-contact region 50*a* has been increased in the direction toward the sound input aperture of the microphone 41. In this case, the input sound level of the microphone 41 is lowered. That is, the on-line touch-panel approach-contact region 50*a*-2 indicated at (c) in FIG. 4 is compared with the reference touch-panel approach-contact region 50*r* indicated at (a). The comparison reveals that the lower end 51 of the on-line region 50*a*-2 on the side of the microphone 41 has been moved toward the sound input aperture of the microphone 41 while the upper end 52 of the on-line region 50*a*-2 on the side of the speaker 42 remains substantially stationary. Thus, the CPU 32 determines that the surface area of the on-line touch-panel approach-contact region 50*a* has been increased in the direction toward the sound input aperture of the microphone 41.

Since the upper end 52 of the on-line touch-panel approach-contact region 50*a*-2 remains substantially stationary, the output sound level of the speaker 42 remains unchanged.

When the sound input aperture of the microphone 41 of the cordless handset 31 is moved from the reference position indicated at (a) in FIG. 4 toward the mouth of the user, while at the same time the microphone 41 is pressed against the face of the user, as indicated at (d) in FIG. 4, the on-line touch-panel approach-contact region 50*a* is moved toward the sound input aperture of the microphone 41, to the on-line position 50*a*-3. In this case, the input sound level of the microphone 41 is greatly lowered. Further, the output sound level of the speaker 42 is raised since the sound output aperture of the speaker 42 is moved away from the ear of the user together with the movement of the sound input aperture of the microphone 41 toward the mouth of the user. That is, the on-line touch-panel approach-contact region 50*a*-3 indicated at (d) in FIG. 4 is compared with the reference touch-panel approach-contact region 50*r* indicated at (a). The comparison reveals that the surface area of the on-line touch-panel approach-contact region 50*a*-3 has been increased and that both the lower end 51 of the on-line region 50*a*-3 on the side of the microphone 41 and the upper end 52 of the on-line region 50*a*-3 on the side of the speaker 42 have been moved toward the sound input aperture of the microphone 41. Thus, the CPU 32 determines that the on-line touch-panel approach-contact region 50*a* has been moved toward the sound input aperture of the microphone 41, to the on-line position 50*a*-3, and that the surface area of the approach-contact region 50*a* has been increased. In this case wherein the input sound level of the microphone 41 is greatly lowered, namely, by an amount larger than that in the case of the movement of the on-line approach-contact region 50*a* to the on-line position 50*a*-1 indicated at (b). As is apparent from FIG. 4, the lower end 51 of the approach-contact region 50*a*-3 indicated at (d) is closer to the sound input aperture of the microphone 41, than that of the approach-contact region 50*a*-1 indicated at (b), so that the input sound level of the microphone 41 must be lowered by the greater amount in the case of the approach-contact region 50*a*-3.

When the sound input aperture of the microphone 41 is moved from the reference position indicated at (a) in FIG. 4 toward the mouth of the user, while at the same time the surface area of the on-line touch-panel approach-contact region 50*a* is reduced, as indicated at (e) in FIG. 4, the on-line touch-panel approach-contact region 50*a* is moved toward the sound input aperture of the microphone 41, to the on-line position 50*a*-4. In this case, the input sound level of the microphone 41 is lowered, while the output sound level of the speaker 42 is greatly raised since the sound output aperture of the speaker 42 is moved away from the ear of the user by a relatively long distance. That is, the on-line touch-panel approach-contact region 50*a*-4 indicated at (e) in FIG. 4 is compared with the reference touch-panel approach-contact region 50*r* indicated at (a). The comparison reveals that the surface area of the on-line touch-panel approach-contact region 50*a*-4 has been reduced and that both of the lower end 51 and upper end 52 of the on-line region 50*a*-4 have been moved toward the sound input aperture of the microphone 41. Thus, the CPU 32 determines that the on-line touch-panel approach-contact region 50*a* has been moved toward the sound input aperture of the microphone 41, to the on-line position 50*a*-4, and that the surface area of the approach-contact region 50*a* has been reduced. In this case wherein the output sound level of the speaker 42 is greatly raised, namely; by an amount larger than that in the case of the movement of the on-line approach-contact region 50*a* to the online position 50*a*-1 indicated at (b). As is apparent from FIG. 4, the upper end 52 of the approach-contact region 50*a*-4 indicated at (e) is more distant from the sound output aperture of the speaker 42, than that of the approach-contact region 50*a*-1 indicated at (b), so that the output sound level of the speaker 42 must be raised by the greater amount in the case of the approach-contact region 50*a*-4.

FIG. 5 shows at (a) one example of the reference touch-panel approach-contact region 53*r*, in reference position and attitude of the cordless handset 31 (touch panel 40) in which the sound output aperture of the speaker 42 has a reference position relative to the ear of the user. FIG. 5 shows at (b) through (e) examples of the four different on-line touch-panel approach-contact regions 53*a*-1 through 53*a*-4, namely, four different touch-panel approach-contact regions 53*a*-1 through 53*a*-4 in respective different positions of the cordless handset 31 during the telephone communication of the user through the cordless handset 31.

When the sound output aperture of the speaker 42 of the cordless handset 31 is moved from a reference position indicated at (a) in FIG. 5 toward the ear of the user, while the sound input aperture of the microphone 41 is moved from the reference position in the direction away from the mouth of the user, as indicated at (b) in FIG. 5, for example, the on-line touch-panel approach-contact region 53*a* is moved toward the sound output aperture of the speaker 42, to the on-line position 53*a*-1. That is, the on-line touch-panel approach-contact region 53*a*-1 indicated at (b) in FIG. 5 is compared with the reference touch-panel approach-contact region 53*r* indicated at (a). The comparison reveals that the surface area of the on-line touch-panel approach-contact region 53*a*-1 is almost equal to that of the reference touch-panel approach-contact region 53*r*, and that both of the lower end 51 and upper end 52 of the on-line region 53*a*-1 have been moved toward the sound output aperture of the microphone 41. Thus, the CPU 32 determines that the on-line touch-panel approach-contact region 53*a* has been moved toward the sound output aperture of the speaker 42.

As a result, the sound levels of the microphone 41 and speaker 42 are controlled according to the sound-level control table of FIG. 3, in the manner corresponding to the result of the comparison, that is, in the manner corresponding to the determination that the on-line region 53*a* has been moved toward the sound output aperture of the speaker 42. Namely, the input sound level of the microphone 41 is raised while the output sound level of the speaker 41 is lowered.

Even in the case of the movement of the speaker 42 of the cordless handset 31 toward the ear of the user from the reference position indicated at (a) in FIG. 5 to the on-line position indicated at (b), therefore, the output sound level of the speaker 42 is lowered to adjust the sound volume to be received by the user, so that the received sound level in the on-line position is almost equal to that in the reference position. Further, the input sound level of the microphone 41 is raised to adjust the sound volume to be received by the microphone 41, so that the sound volume to be transmitted to the external device (not shown) in the on-line position is almost equal to that in the reference position, even in the case of the movement of the microphone 41 away from the mouth of the user.

When the speaker 42 of the cordless handset 31 in the reference position indicated at (a) in FIG. 5 is pressed against the face of the user, as indicated at (c) in FIG. 5, the comparison of the on-line touch-panel approach-contact region 53*a* with the reference touch-panel approach-contact region 53*r* reveals that the surface area of the on-line touch-panel approach-contact region 53*a* has been increased in the direction toward the sound output aperture of the speaker 42. In this case, the output sound level of the speaker 42 is lowered. That is, the on-line touch-panel approach-contact region 53*a*-2 indicated at (c) in FIG. 5 is compared with the reference touch-panel approach-contact region 53*r* indicated at (a). The comparison reveals that the surface area of the on-line touch-panel approach-contact region 53*a* has been increased and that the upper end 52 of the on-line region 53*a*-2 on the side of the speaker 42 has been moved toward the sound output aperture of the speaker 42 while the lower end 51 of the on-line region 53*a*-2 remains substantially stationary. Thus, the CPU 32 determines that the surface area of the on-line touch-panel approach-contact region 53*a* has been increased in the direction toward the sound output aperture of the speaker 42. Since the lower end 51 of the on-line touch-panel approach-contact region 53*a*-3 remains substantially stationary, the input sound level of the microphone 41 remains unchanged.

When the sound output aperture of the speaker 42 of the cordless handset 81 is moved from the reference position indicated at (a) in FIG. 5 toward the ear of the user, while at the same time the speaker 42 is pressed against the face of the user, as indicated at (d) in FIG. 5, the on-line touch-panel approach-contact region 53*a* is moved toward the sound output aperture of the speaker 42, to the on-line position 53*a*-3. In this case, the output sound level of the speaker 42 is greatly lowered. Further, the input sound level of the microphone 41 is raised since the sound input aperture of the microphone 41 is moved away from the mouth of the user together with the movement of the sound output aperture of the speaker 42 toward the ear of the user. That is, the on-line touch-panel approach-contact region 53*a*-3 indicated at (d) in FIG. 5 is compared with the reference touch-panel approach-contact region 53*r* indicated at (a). The comparison reveals that the surface area of the on-line touch-panel approach-contact region 53*a*-8 has been increased and that both the upper end 52 and the lower end 51 of the on-line region 53*a*-8 have been moved toward the sound output aperture of the speaker 42. Thus, the CPU 32 determines that the on-line touch-panel approach-contact region 53*a* has been moved toward the sound output aperture of the speaker 42, to the on-line position 53*a*-3, and that the surface area of the approach-contact region 53*a* has been increased. In this case wherein the output sound level of the speaker 42 is greatly lowered, namely, by an amount larger than that in the case of the movement of the on-line approach-contact region 53*a* to the on-line position 53*a*-1 indicated at (b). As is apparent from FIG. 5, the upper end 52 of the approach-contact region 53*a*-3 indicated at (d) is closer to the sound output aperture of the speaker 42, than that of the approach-contact region 53*a*-1 indicated at (b), so that the output sound level of the speaker 42 must be lowered by the greater amount in the case of the approach-contact region 53*a*-3.

When the sound output aperture of the speaker 42 is moved from the reference position indicated at (a) in FIG. 5 toward the ear of the user, while at the same time the surface area of the on-line touch-panel approach-contact region 53*a* is reduced, as indicated at (e) in FIG. 5, the on-line touch-panel approach-contact region 53*a* is moved toward the sound output aperture of the speaker 42, to the on-line position 53*a*-4. In this case, the output sound level of the speaker 42 is lowered, while the input sound level of the microphone 41 is greatly raised since the sound input aperture of the microphone 41 is moved away from the mouth of the user by a relatively long distance. That is, the on-line touch-panel approach-contact region 53*a*-4 indicated at (e) in FIG. 5 is compared with the reference touch-panel approach-contact region 53r indicated at (a). The comparison reveals that the surface area of the on-line touch-panel approach-contact region 53a-4 has been reduced and that both of the upper end 52 and lower end 51 of the on-line region 53a-4 have been moved toward the sound output aperture of the speaker 42. Thus, the CPU 32 determines that the on-line touch-panel approach-contact region 53a has been moved toward the sound output aperture of the speaker 42, to the on-line position 53a-4, and that the surface area of the approach-contact region 53a has been reduced. In this case wherein the sound input level of the microphone 41 is greatly raised, namely, by an amount larger than that in the case of the movement of the on-line approach-contact region 53a to the on-line position 53a-1 indicated at (b). As is apparent from FIG. 5, the lower end 51 of the approach-contact region 53a-4 indicated at (e) is more distant from the sound input aperture of the microphone 41, than that of the approach-contact region 53a-1 indicated at (b), so that the output input level of the microphone 41 must be raised by the greater amount in the case of the approach-contact region 53a-4.

Referring back to FIG. 2, the RAM 34 of the cordless handset 31 is a re-writable memory, which temporarily stores various kinds of data. The RAM 34 includes the above-indicated reference touch-panel approach-contact region memory 34a serving as a reference-state memory portion, and on-line touch-panel approach-contact region memory 34b, and a waiting-time memory 34c. The reference touch-panel approach-contact region memory 34a stores the above-described reference touch-panel approach-contact region 50r, 53r as a reference approach-contact state, while the on-line touch-panel approach-contact region memory 34b stores the above-described on-line touch-panel approach-contact region 50a, 53a.

The wireless communication control circuit 37 has a wireless communication antenna 38 and is configured to effect wireless communication with the wireless communication control circuit 19 of the MFP 1, as indicated at 300 in FIG. 2, for transmission and reception of various kinds of data and sound signals between the control circuits 37, 19.

Referring to the flow chart of FIG. 6, there will be described the telephone communication control routine executed by the CPU 32 of the cordless handset 31 which serves as the child unit and the telephone communication device according to the present embodiment. The telephone communication control routine is executed to adjust or set the input sound level of the microphone 41 and the output sound level of the speaker 42, according to a change of the on-line touch-panel approach-contact region 50a, 53a, which changes takes place during the telephone communication through the cordless handset 31. The control routine is initiated upon initiation of the telephone communication, and is repeatedly executed until the telephone communication is terminated.

Figure 6:
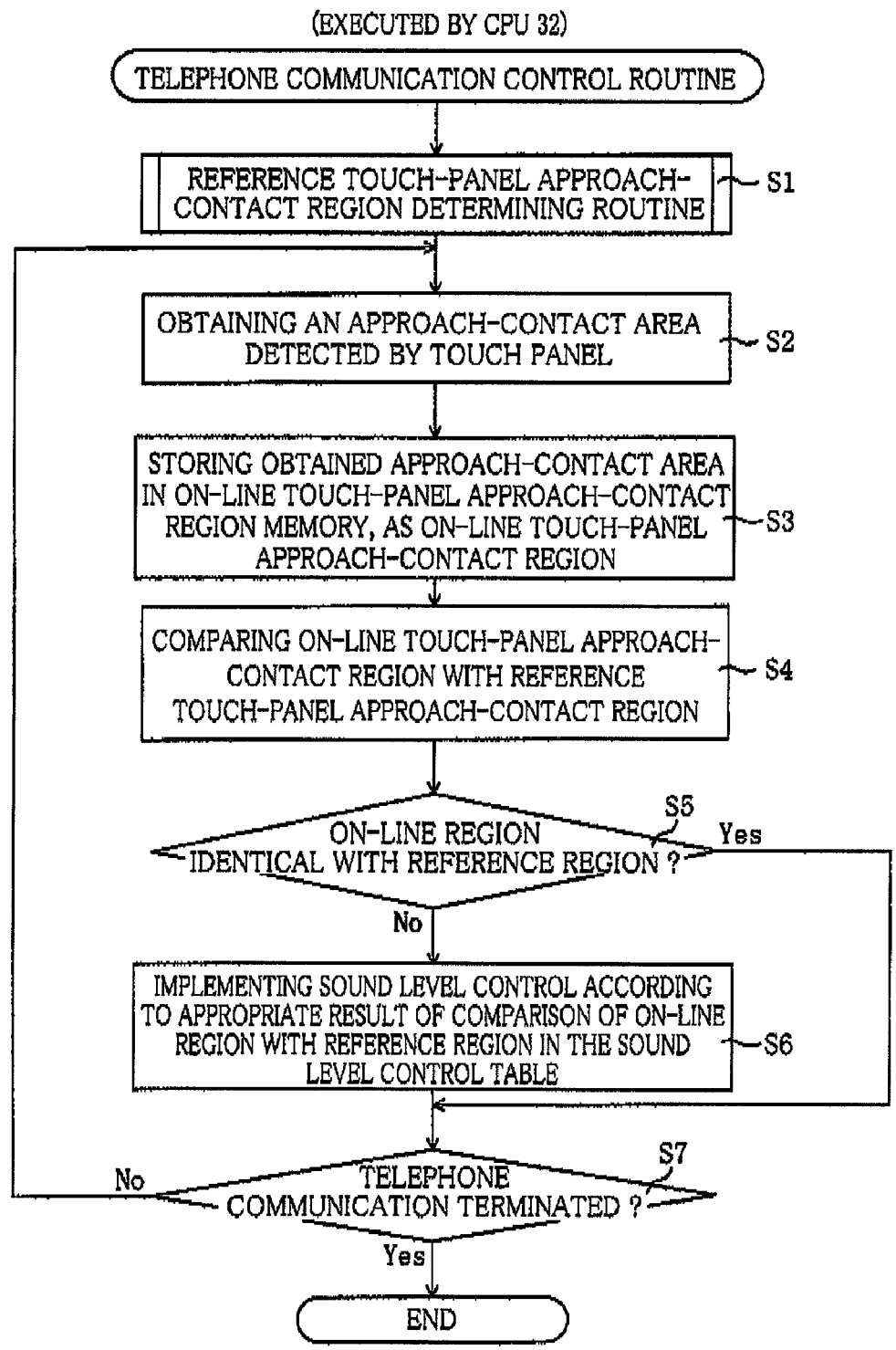
FIG. 6 is a flow chart illustrating a telephone communication control routine executed by the cordless handset.
Figure 7:
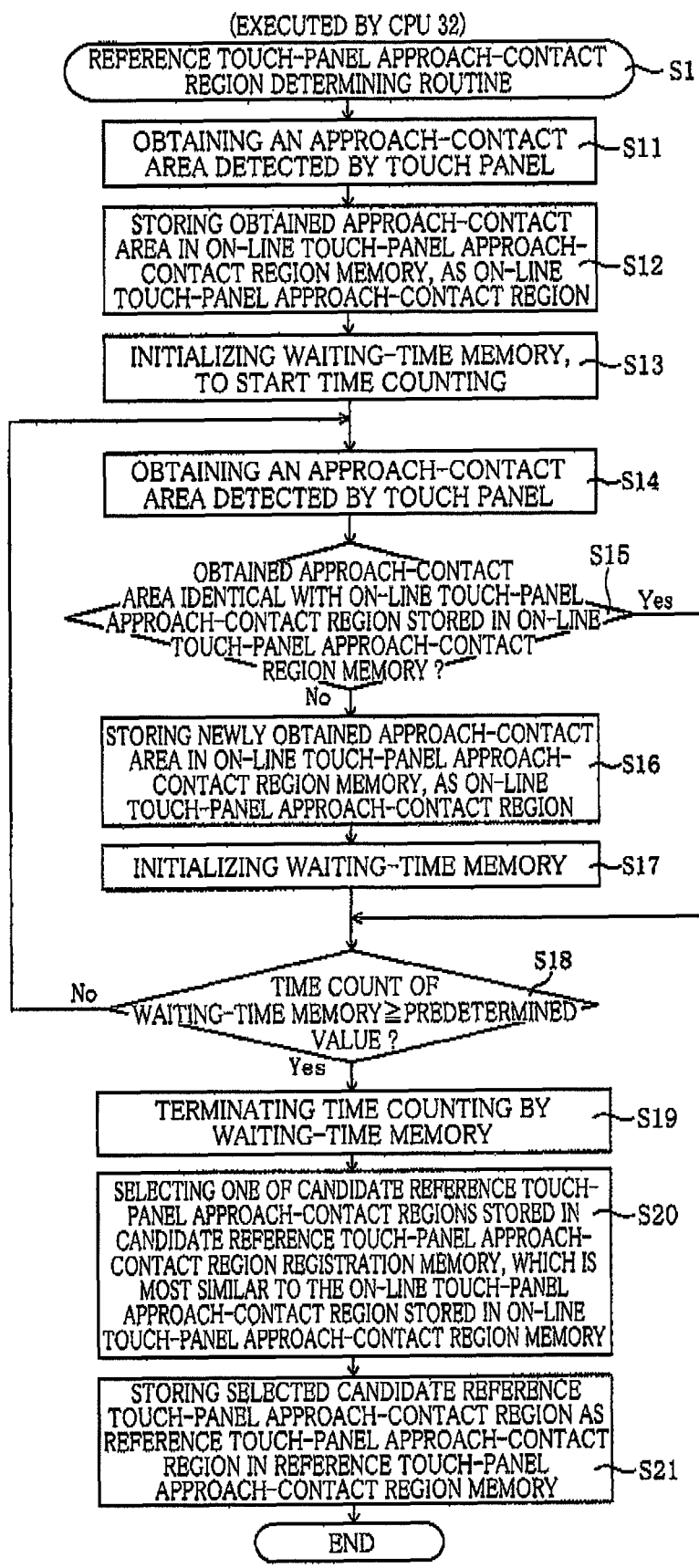
FIG. 7 is a flow chart illustrating a routine for determining the reference touch-panel approach-contact region, which is executed by the cordless handset.

The telephone communication control routine of FIG. 6 is initiated with step S1 in which the reference touch-panel approach-contact region 50r, 53r is determined according to the reference touch-panel approach-contact region determining routine illustrated in the flow chart of FIG. 7, which is executed by the CPU 32 of the cordless handset 31. The reference touch-panel approach-contact region determining routine is executed in the first step S1 of the telephone communication control routine of FIG. 6, when the telephone communication of the user with the other party is initiated. This control routine is executed each time the telephone communication of the user with the other party is implemented.

The reference touch-panel approach-contact region determining routine is formulated to determine, as the reference touch-panel approach-contact region, the on-line touch-panel approach-contact region 50a, 53a which is obtained when the position and attitude or posture of the cordless handset 31 as held by the user are stabilized after initiation of the telephone communication.

The reference touch-panel approach-contact region determining routine is initiated with step S11 to obtain an approach-contact area of the touch panel 40, which is detected by the matrix of electrodes of the touch panel 40. Then, the control flow goes to step S12 to store the obtained approach-contact area of the touch panel 40 in the on-line touch-panel approach-contact region memory 34b of the RAM 34, as the on-line touch-panel approach-contact region.

Then, the control flow goes to step S13 to initialize the waiting-time memory 34c of the RAM 34, for starting time counting to measure a time lapse, by incrementing a count for each time lapse of 100 ms, for example.

The control flow then goes to step S14 to obtain again an approach-contact area of the touch panel 40, and to step S15 to determine whether the newly obtained approach-contact area is identical with the on-line touch-panel approach-contact region stored in the on-line touch-panel approach-contact region memory 34b.

If a negative determination (No) is obtained in step S15, the control flow goes to step S16 in which the approach-contact area newly obtained in step S14 is stored in the on-line touch-panel approach-contact region memory 34b, as the new on-line touch-panel approach-contact region. Then, step S17 is implemented to initialize the waiting-time memory to re-start the time counting.

If an affirmative determination (Yes) is obtained in step S15, on the other hand, the control flow goes to step S18 while skipping the steps S16 and S17.

The step S18 is implemented to determine whether the time count of the waiting-time memory 34c has reached a predetermined value corresponding to a predetermined time (e.g., 10 seconds). If a negative determination (No) is obtained in step S18, the control flow goes back to step S14. The negative determination (No) means that the position and attitude or posture of the cordless handset 31 as held by the user is changing and are not yet stable. The above-described steps S14-S18 are repeatedly implemented until an affirmative determination (Yes) is obtained in step S18

The affirmative determination (Yes) in step S18 indicates that the position and attitude or posture of the cordless handset 31 as held by the user have been stabilized. In this case, the control flow goes to step S19 to terminate the time counting by the waiting-time memory 34c.

The step S19 is followed by step S20 to select one of the plurality of candidate reference touch-panel approach-contact regions stored in the candidate reference touch-panel approach-contact region registration memory 33a, which is most similar to the on-line touch-panel approach-contact region stored in the on-line touch-panel approach-contact region memory 34b. Then, the control flow goes to step S21 in which the selected candidate reference touch-panel approach-contact region is stored in the reference touch-panel approach-contact region memory 34a, as the reference touch-panel approach-contact region. The reference touch-panel approach-contact region determining routine is terminated with step S21. It will be understood that the candidate reference touch-panel approach-contact region memory 33a serves as a candidate reference-state registration memory portion for storing a plurality of candidate reference states of approach or contact of the housing 49 to or with the user's face, and that a portion of the CPU 32 assigned to implement the step S20 serves as a reference-approach-contact-state determining portion configured to determine, as the reference approach-contact state, the state of approach or contact of the housing to or with the face of the user, which is detected by when the housing is placed in a reference position with respect to the face of the user after the telephone communication of the user with the other party is initiated. The reference-approach-contact-state determining potion includes a selecting portion configured to select one of the plurality of candidate reference approach-contact state which is identical with or similar to the state of approach or contact of the region of the housing to or with the face of the user, which state of approach or contact is detected when the housing is placed in the reference position with respect to the face of the user.

Thus, according to the reference touch-panel approach-contact region determining routine of FIG. 7, the on-line touch-panel approach-contact region which is obtained while the attitude of the cordless handset 31 as held by the user is stable after initiation of the telephone communication is compared with the candidate reference touch-panel approach-contact regions stored in the candidate reference touch-panel approach-contact region registration memory 33a, and one of the candidate regions which is most similar to the on-line touch-panel approach-contact region obtained while the attitude is stable is selected as the reference touch-panel approach-contact region and stored in the reference touch-panel approach-contact region memory 34a.

Referring back to the flow chart of FIG. 6, the step S1 is followed by step S2 to obtain a touch-panel approach-contact area of the touch panel 40, which is detected by the matrix of electrodes. Then, the control flow goes to step S3 to store the obtained touch-panel approach-contact area in the on-line touch-panel approach-contact region memory 34b, as the on-line touch-panel approach-contact region.

The control flow then goes to step S4 to compare the on-line touch-panel approach-contact region stored in the on-line touch-panel approach-contact region memory 34b, with the reference touch-panel approach-contact region stored in the reference touch-panel approach-contact region memory 34a. It will be understood that a portion of the CPU 32 assigned to implement this step S4 serves as a state-change obtaining portion configured to obtain a change of the on-line touch-panel approach-contact region with respect to the reference touch-panel approach-contact region.

Then, step S5 is implemented to determine whether the on-line touch-panel approach-contact region is identical with the reference touch-panel approach-contact region. If a negative determination (No) is obtained in step S5, the control flow goes to step S6 to implement a sound level control of the microphone 41 and speaker 42 which corresponds to an appropriate one of the results of comparison of the on-line touch-panel approach-contact region with the reference touch-panel approach-contact region, which are listed in the sound level control table of FIG. 3. It will be understood that a portion of the CPU 32 assigned to implement the step S6 serves as an adjustment-amount determining portion configured to determine an amount of adjustment of the sound output level of the speaker 42 and an amount of adjustment of the sound input level of the microphone 41, according to the change of the on-line touch-panel approach-contact region with respect to the reference touch-panel approach-contact region, and also serves as a control portion configured to command the adjustment-amount determining portion to determine the amount of adjustment of the sound output level and the amount of adjustment of the sound input level, and to adjust the sound output level and the sound input level according to the determined amounts of adjustment. It will further be understood that portion of the CPU 32 assigned to implement the step S6 serves as a specifying portion configured to specify one of the different modes of change (stored in the sound-level control table memory 33b) of the on-line touch-panel approach-contact region with respect to the reference touch-panel approach-contact region, which one mode of change is identical with or similar to the detected change of the on-line touch-panel approach-contact region with respect to the reference touch-panel approach-contact region.

If the comparison in step S4 reveals that the on-line touch-panel approach-contact region 50a has been moved toward the sound input aperture of the microphone 41, for instance, the sound level control is implemented to lower the input sound level of the microphone 41 and raise the output sound level of the speaker 42, according to the sound level control table of FIG. 3

If the user moves the cordless handset 31 away from the face during the telephone communication, any area within the touch panel 40 is not detected as a touch-panel approach-contact area. In this case, the comparison in step S4 reveals that an approach to or contact with the touch panel 40 is not detected. Accordingly, the operation mode of the cordless handset 31 is changed from a normal telephone mode to a hands-free telephone mode in which the telephone communication is available without a need of the user to hold the cordless handset 31. In the hands-free telephone mode, the input sound level of the microphone 41 and the output sound level of the speaker 42 are considerably raised to enable the user to hear the sound from the speaker 42 and to permit the user's voice to be received by the microphone 41, even when the cordless handset 31 is positioned away from the user's face.

Once the hands-free telephone mode is established, this mode is maintained until an on-line touch-panel approach-contact region is detected within the touch panel 40. In other words, the cordless handset 31 is returned to a normal hand-held telephone mode when an on-line touch-panel approach-contact region is detected within the touch panel 40 in the hands-free telephone mode.

An affirmative determination (Yes) is obtained in step S5, the control flow goes to step S7 means that the on-line touch-panel approach-contact region remains identical with the reference touch-panel approach-contact region, namely, does not change from the reference touch-panel approach-contact region (in terms of the position and surface area). In this case, the control flow goes to step S7.

The step S7 is implemented to determine whether the telephone communication is terminated. If a negative determination (No) is obtained in step S7, the control flow goes back to step S2. The above-described Steps S2-S7 are repeatedly implemented until an affirmative determination (Yes) is obtained in the step S7. The present telephone communication control routine of FIG. 6 is terminated if the affirmative determination (Yes) is obtained in step S7, that is, when the telephone communication is terminated.

According to the reference touch-panel approach-contact region determining routine of FIG. 7 executed in step S1 of the telephone communication control routine of FIG. 6, one of the registered candidate reference touch-panel approach-contact regions which is most similar to the on-line touch-panel approach-contact region that is maintained for more than the predetermined time after initiation of the telephone communication is set or selected as the reference touch-panel approach-contact region. The input sound level of the microphone 41 (sound volume to be transmitted to the other party) and the output sound level of the speaker 42 (sound volume to be received by the user) are adequately adjusted to the optimum values corresponding to the reference touch-panel approach-contact region, in response to a change of the on-line touch-panel approach-contact region detected clue to a movement of the cordless handset 31 relative to the mouth and ear of the user during the telephone communication.

Generally, the position and attitude of the cordless handset 31 are adjusted or changed by the user after initiation of the telephone communication through the telephone network, depending upon the sound volume received from the other party and the environmental noise, until the sound volume to be transmitted to the other part and the sound volume to be received by the user are optimized. One of the candidate reference touch-panel approach-contact regions which is most similar to the on-line touch-panel approach-contact region obtained in the position and attitude of the cordless handset 31 when the sound volumes are optimum is selected as the reference touch-panel approach-contact region with which the on-line touch-panel approach-contact region obtained, during the telephone communication is compared to detect a change of the position and attitude of the cordless handset 31. The input sound level of the microphone 41 and the output sound level of the speaker 42 are adjusted according to the change of the attitude of the cordless handset 31, that is, according to a change of the on-line touch-panel approach-contact region relative to the reference touch-panel approach-contact region, so that the sound volume to be transmitted to the other party and the sound volume to be received by the user are adjusted to the optimum values corresponding to the reference touch-panel approach-contact region obtained in the reference position and attitude of the cordless handset 31, when the sound volumes are optimum.

While the preferred embodiment of the present invention has been described by reference to the accompanying drawings, it is to be understood that the invention is not limited to the details of the illustrated embodiment, but may be embodied with various changes and improvements, which may occur to those skilled in the art without departing from the spirit and scope of the present invention.

In the illustrated embodiment, the cordless handset 31 is provided as a telephone receiver of the child unit. However, the MFP 1 (parent unit) may be provided with a telephone receiver which is separable from the MFP 1 and the input and output sound levels of which are adjusted according to a sound level control table and a telephone communication control routine, which are similar to those of FIGS. 3 and 6. Described in detail, the telephone receiver of the MFP 1 is provided with a touch panel similar to the touch panel 40 of the cordless handset 31, so that the input sound level of the microphone and the output sound level of the speaker of the telephone receiver are controlled according to a change of the on-line touch-panel approach-contact region detected by the touch panel during the telephone communication through the telephone receiver of the MFP 1.

The foregoing description of the illustrated embodiment relates to the sound level control of the cordless handset 31 according to a substantially linear movement of the cordless handset 31 toward and away from the mouth and ear of the user and a substantially linear movement of the cordless handset 31 against the face of the user, the principle of the present invention is applicable to a sound level control of the cordless handset 31 according to a pivotal movement of the cordless handset 31 about the sound output aperture of the speaker 42 (usually located near the ear of the user). This pivotal movement of the cordless handset 31 results in a movement of the microphone 41 toward or away from the mouth of the user, and a change of the on-line touch-panel approach-contact region with respect to the reference touch-panel approach-contact region. If the surface area of the on-line touch-panel approach-contact region is increased as a result of the pivotal movement of the cordless handset 31, for example, the input sound level of the microphone 41 is lowered. Thus, the present invention is applicable to the control of the input sound level of the microphone 41 and the output sound level of the speaker 42 in response to a pivotal movement of the cordless handset 31.

In the illustrated embodiment, the plurality of candidate reference touch-panel approach-contact regions are stored in the candidate reference touch-panel approach-contact region registration memory 33*a* of the ROM 33. This registration memory 33*a* is not essential. In the absence of the registration memory 33*a*, the on-line touch-panel approach-contact region obtained when the position and attitude of the cordless handset 31 as held by the user is stabilized after initiation of the telephone communication is stored in the reference touch-panel approach-contact region memory 34*a*. In this case, the required capacity of the ROM 33 can be reduced, or the ROM 33 can be used to store various other kinds of data.

Although the touch panel 40 used in the illustrated embodiment is of the projection type and capacitance type, the touch panel 40 may be of any other type. For example, the touch panel 40 may be configured to detect a finger touch with a pressure sensor, or a finger touch or approach with an infrared ray or electric field.

The cordless handset 31 provided at the illustrated embodiment has the LCD 39 and touch panel 40 disposed over an almost entire area of its front surface. Where control keys are provided on the front surface of the cordless handset 31 as in an ordinary telephone receiver, a touch panel may be provided on the top or upper surfaces of the control keys, or around the control keys.

In the illustrated embodiment, the LCD 39 and touch panel 40 are provided over an almost entire area of the front surface of the cordless handset 31. However, touch panels may be disposed in areas near the sound output aperture of the speaker 42 and the sound input aperture of the microphone 41, such that the regions of the touch panels which approach or touch the face of the user are detected by the touch panels, so that the sound levels of the cordless handset 31 can be controlled according to a direction of movement of the on-line touch-panel approach-contact region or a change of the surface area of this on-line touch-panel approach-contact region.

In the illustrated embodiment, the sound level control table of FIG. 3 lists the nine different manners of control of the sound levels of the telephone communication device in the form of the cordless handset 31, which correspond to the respective nine different results of comparison of the on-line touch-panel approach-contact region with the reference touch-panel approach-contact region. However, the number of the results of comparison and the number of the corresponding manners of control of the sound levels may be increased to more intricately adjust the input sound level of the microphone 41 and the output sound level of the speaker 42, namely, to permits the sound levels to be changed in a larger number of steps.

In the illustrated embodiment, the telephone communication device is the parent unit in the form of the cordless handset 31 capable of wireless or radio communication with the parent unit in the form of the MFP 1. However, the telephone communication according to the present invention is not limited to the cordless handset 31, and the principle of this invention is applicable to any other type of telephone communication such as a telephone receiver wire-connected to the MFP 1, a mobile or portable phone, and a transceiver.

What is claimed is:

1. A telephone communication device for telephone communication of a user thereof with the other party, comprising:
    a housing;
    a sound generating portion having a sound output aperture provided at the housing and configured to generate a voice received from the other party such that the voice is emitted from the sound output aperture with an adjustable sound output level;
    a sound receiving portion having a sound input aperture provided at the housing and configured to receive through the sound input aperture a voice to be transmitted to the other party, such that the voice is received with an adjustable sound input level;
    a detecting portion configured to detect a state of approach or contact of a region of the housing between said sound output aperture and said sound input aperture, to or with a face of the user, during the telephone communication of the user with the other party;
    a reference-state memory, portion for storing a reference approach-contact state, which is the state of approach or contact of said region detected in a reference state of said approach or contact of the region of the housing, said reference state being one of the states of approach or contact of the region detected by said detecting portion;
    a state-change obtaining portion configured to obtain a change of the state of approach or contact of said region detected by the detecting portion, with respect to said reference approach-contact state stored in the reference-state memory portion;
    an adjustment-amount determining portion configured to determine an amount of adjustment of the sound output level of the sound generating portion and an amount of adjustment of the sound input level of the sound receiving portion, according to the change of said state obtained by the state-change obtaining portion; and
    a control portion configured to command the adjustment-amount determining portion, when the change of said state is obtained by the state-change obtaining portion, to determine the amount of adjustment of the sound output level of the sound generating portion and the amount of adjustment of the sound input level of the sound receiving portion, said control portion adjusting said sound output level and said sound input level according to the determined amounts of adjustment.

2. The telephone communication device according to claim 1, wherein the state-change obtaining portion obtains, as said change of the state of approach or contact, a change of said region the approach or contact of which to or with the face of the user is detected by the detecting portion,
    and wherein the adjustment-amount determining portion determines the amounts of adjustment of the sound output level and the sound input level, according to at least one of the following rules 1-8;
    rule 1: lowering the sound input level and raising the sound output level when the region detected by the detecting portion is moved toward the sound input aperture while a surface area of the region remains substantially constant;
    rule 2: raising the sound input level and lowering the sound output level when the region detected by the detecting portion is moved toward the sound output aperture while the surface area of the region remains substantially constant;
    rule 3: lowering the sound input level when the surface area of the region detected by the detecting portion is increased while an end of the region on the side of the sound input aperture is moved toward the sound input aperture;
    rule 4: lowering the sound output level when the surface area of the region detected by the detecting portion is increased while an end of the region on the side of the sound output aperture is moved toward the sound output aperture;
    rule 5: lowering the sound input level and raising the sound output level when the surface area of the region detected by the detecting portion is increased while the end of the region on the side of the sound input aperture is moved toward the sound input aperture and the end of the region on the side of the sound output aperture is moved away from the sound output aperture;
    rule 6: raising the sound input level and lowering the sound output level when aperture the surface area of the region detected by the detecting portion is increased while the end of the region on the side of the sound output aperture is moved toward the sound output aperture and the end of the region on the side of the sound input aperture is moved away from the sound input;
    rule 7; lowering the sound input level and raising the sound output level when the surface area of the region detected by the detecting portion is reduced while the end of the region on the side of the sound input aperture is moved toward the sound input aperture; and
    rule 8: raising the sound input level and lowering the sound output level when the surface area of the region detected by the detecting portion is reduced while the end of the region on the side of the sound output aperture is moved toward sound output aperture.

3. The telephone communication device according to claim 2, wherein the amount of adjustment of lowering the sound input level according to said rule 5 is larger than the amount of adjustment of lowering the sound input level according to said rule 1.

4. The telephone communication device according to claim 2, wherein the amount of adjustment of raising the sound output level according to said rule 7 is larger than the amount of adjustment of raising the sound output level according to said rule 1.

5. The telephone communication device according to claim 2, wherein the amount of adjustment of lowering the sound output level according to said rule 6 is larger than the amount of adjustment of lowering the sound output level according to said rule 2.

6. The telephone communication device according to claim 2, wherein the amount of adjustment of raising the sound input level according to said rule 8 is larger than the amount of adjustment of raising the sound input level according to said rule 2.

7. The telephone communication device according to claim 1, further comprising:
    a different-modes memory portion which stores different modes of said change of the state of approach or contact of said region with respect to said reference approach-contact state, and at least one of the amounts of adjustment of the sound input level and the sound output level which respectively correspond to said different modes of said change; and
    a specifying portion configured to specify one of said different modes of said change of the state of approach or contact of the region stored in the sound-level-control-table memory portion, which one mode of change is identical with or similar to the change of the state of approach or contact of the region detected by said state-changing obtaining portion, and wherein the adjustment-amount determining portion selects the at least one of the amounts of adjustment of the sound output level and the sound input level which corresponds to the mode of change specified by the specifying portion.

8. The telephone communication device according to claim 1, which has a normal telephone mode in which the telephone communication is implemented with said housing held by the user, and a hands-free telephone mode in which the telephone communication is implemented without the housing held by the user, and wherein said control portion changes a mode of operation of the telephone communication device from the normal telephone mode to the hands-free telephone mode when the detecting portion fails to detect the state of approach or contact of the region of the housing to or with the face of the user.

9. The telephone communication device according to claim 1, further comprising a display portion superposed on said region of the housing between the sound output aperture and the sound input aperture and configured to display images, and wherein the detecting portion is configured to detect an approach or contact of a pointer to or with a selected one of the images displayed on the display portion.

10. The telephone communication device according to claim 1, further comprising a stable-state determining portion configured to determine whether the state of approach or contact of the region of the housing detected by the detecting portion is maintained for more than a predetermined time, and wherein said reference-state memory portion stores, as said reference approach-contact state, said state of approach or contact of the region of the housing which has been maintained for more than the predetermined time according to the determination by said stable-state determining portion.

11. The telephone communication device according to claim 1, wherein said reference-state memory portion includes a reference-approach-contact-state determining portion configured to determine, as said reference approach-contact state, a state of approach or contact of the region of the housing to or with the face of the user, which is detected by the detecting portion after the telephone communication of the user with the other party is initiated, the reference-state memory portion storing the state of approach or contact of the region of the housing determined by the reference-approach-contact-state determining portion.

12. The telephone communication device according to claim 11, wherein the reference-approach-contact-state determining portion determines said reference approach-contact state each time the telephone communication is implemented.

13. The telephone communication device according to claim 11, further comprising a candidate reference-state registration memory portion for storing a plurality of candidate reference approach-contact states, and wherein the reference-approach-contact-state determining potion includes a selecting portion configured to select one of the plurality of candidate reference approach-contact state which is identical with or similar to the state of approach or contact of the region of the housing, and wherein the reference-approach-contact-state determining portion determines, as said reference approach-contact state, the candidate reference approach-contact state selected by the selecting portion.

\* \* \* \* \*